US012714143B2

(12) United States Patent
Thorens

(10) Patent No.: US 12,714,143 B2
(45) Date of Patent: Aug. 25, 2026

(54) ASSEMBLY WITH CAPILLARY MEDIUM AND AIR IMPINGEMENT STRUCTURE DEFINING FIRST OPENING

(71) Applicant: Altria Client Services LLC, Richmond, VA (US)

(72) Inventor: Michel Thorens, Moudon (CH)

(73) Assignee: Altria Client Services LLC, Richmond, VA (US)

( * ) Notice: Subject to any disclaimer, the term of this patent is extended or adjusted under 35 U.S.C. 154(b) by 148 days.

(21) Appl. No.: 18/641,812

(22) Filed: Apr. 22, 2024

(65) Prior Publication Data

US 2024/0268465 A1 Aug. 15, 2024

Related U.S. Application Data

(60) Continuation of application No. 17/961,998, filed on Oct. 7, 2022, now Pat. No. 11,969,016, which is a (Continued)

(30) Foreign Application Priority Data

Aug. 7, 2015 (EP) .................................... 15180209

(51) Int. Cl.
*A24F 40/46* (2020.01)
*A24F 40/10* (2020.01)
(Continued)

(52) U.S. Cl.
CPC .............. *A24F 40/46* (2020.01); *A24F 40/44* (2020.01); *H05B 3/34* (2013.01); *A24F 40/10* (2020.01); *H05B 2203/021* (2013.01)

(58) Field of Classification Search
CPC .......... A24F 40/44; A24F 40/46; A24F 40/10; H05B 3/34; H05B 2203/021
See application file for complete search history.

(56) References Cited

U.S. PATENT DOCUMENTS 1,949,803 A * 3/1934 Loebs ...................... F02M 1/00 138/40
2,544,206 A 3/1951 Wilson
(Continued)

FOREIGN PATENT DOCUMENTS

CN 103338664 A 10/2013
CN 103932401 A 7/2014
(Continued)

OTHER PUBLICATIONS

Korean Notice of Allowance, dated Jun. 25, 2024, issued in Korean Patent Application No. 10-2017-7037929.
(Continued)

*Primary Examiner* — Thien S Tran
(74) *Attorney, Agent, or Firm* — Harness, Dickey & Pierce, P.L.C.

(57) ABSTRACT

The assembly including a capillary medium defining a duct, and an air impingement structure defining a first opening, the air impingement structure including electrically conductive filaments, the air impingement structure being connected to a surface of the capillary medium, at least one first portion of the air impingement structure extending into the surface of the capillary medium.

21 Claims, 5 Drawing Sheets

Related U.S. Application Data division of application No. 16/369,977, filed on Mar. 29, 2019, now Pat. No. 11,464,258, which is a continuation of application No. 15/229,266, filed on Aug. 5, 2016, now Pat. No. 10,244,794, which is a continuation of application No. PCT/EP2016/067702, filed on Jul. 25, 2016.

(51) Int. Cl.

| | |
|---|---|
| ***A24F 40/44*** | (2020.01) |
| ***H05B 3/34*** | (2006.01) |

(56) References Cited

U.S. PATENT DOCUMENTS

| | | | | |
|---|---|---|---|---|
| 4,019,021 | A | 4/1977 | Schladitz | |
| 6,309,448 | B1 | 10/2001 | Mizobe | |
| 2008/0223844 | A1 | 9/2008 | Cronn | |
| 2011/0155718 | A1 | 6/2011 | Greim et al. | |
| 2011/0226236 | A1 | 9/2011 | Buchberger | |
| 2012/0279512 | A1 | 11/2012 | Hon | |
| 2013/0190607 | A1 | 7/2013 | Biber et al. | |
| 2013/0192623 | A1 | 8/2013 | Tucker et al. | |
| 2014/0166029 | A1 | 6/2014 | Weigensberg et al. | |
| 2014/0190478 | A1* | 7/2014 | Liu | A24F 40/44 128/202.21 |
| 2014/0238423 | A1 | 8/2014 | Tucker et al. | |
| 2014/0314397 | A1 | 10/2014 | Alima | |
| 2015/0020822 | A1 | 1/2015 | Janardhan et al. | |
| 2015/0090279 | A1 | 4/2015 | Chen | |
| 2015/0101606 | A1 | 4/2015 | White | |
| 2015/0114409 | A1 | 4/2015 | Brammer et al. | |
| 2015/0136156 | A1 | 5/2015 | Liu | |
| 2015/0208731 | A1 | 7/2015 | Malamud et al. | |
| 2015/0335074 | A1 | 11/2015 | Leung | |
| 2016/0345630 | A1 | 12/2016 | Mironov et al. | |
| 2017/0035109 | A1* | 2/2017 | Liu | A24F 40/42 |

FOREIGN PATENT DOCUMENTS

| | | | | |
|---|---|---|---|---|
| CN | 103948174 | A | 7/2014 | |
| CN | 104010529 | A | 8/2014 | |
| CN | 104135881 | A | 11/2014 | |
| CN | 203986096 | U | * 12/2014 | F22B 1/285 |
| CN | 204232292 | U | 4/2015 | |
| CN | 107809921 | A | 3/2018 | |
| EA | 019736 | A1 | 3/2012 | |
| GB | 2504075 | A | 1/2014 | |
| JP | 2015/500025 | A | 1/2015 | |
| JP | 2015505476 | A | 2/2015 | |
| JP | 2015-519903 | A | 7/2015 | |
| RU | 2297781 | C2 | 4/2007 | |
| RU | 2509516 | C2 | 3/2014 | |
| WO | 2010091593 | A1 | 8/2010 | |
| WO | 2011/137453 | A2 | 11/2011 | |
| WO | 2013/083638 | A1 | 6/2013 | |
| WO | 2015/043132 | A1 | 4/2015 | |
| WO | 2015101479 | A1 | 7/2015 | |
| WO | 2015/114327 | A1 | 8/2015 | |
| WO | 2015/114328 | A1 | 8/2015 | |
| WO | 2015/117702 | A1 | 8/2015 | |
| WO | 2015/117704 | A1 | 8/2015 | |
| WO | 2015/117705 | A2 | 8/2015 | |
| WO | 2015/165812 | A1 | 11/2015 | |
| WO | 2016/092261 | A1 | 6/2016 | |
| WO | 2016/096780 | A1 | 6/2016 | |
| WO | 2016/174179 | A1 | 11/2016 | |
| WO | 2017/005471 | A1 | 1/2017 | |

OTHER PUBLICATIONS

Non-Final Office Action dated Mar. 8, 2018 for U.S. Appl. No. 15/229,266.

International Search Report and Written Opinion for PCT/EP2016/067703 dated Jul. 25, 2016.

Final Office Action issued on Aug. 28, 2018 for co-pending U.S. Appl. No. 15/229,266.

Office Action dated Aug. 24, 2021, issued in corresponding U.S. Appl. No. 16/369,977.

Office Action dated Jan. 25, 2022, issued in corresponding U.S. Appl. No. 16/369,977.

Notice of Allowance dated Apr. 21, 2022, issued in corresponding U.S. Appl. No. 16/369,977.

Notice of Allowance dated May 31, 2022, issued in corresponding U.S. Appl. No. 16/369,977.

Extended European Search Report Dated Jan. 27, 2016 for European Patent Application No. 15180209.7.

Extended European Search Report Dated Jan. 27, 2016 for European Patent Application No. 15180205.5.

Non-Final Office Action dated Mar. 9, 2018 for U.S. Appl. No. 15/229,284.

Written Opinion for PCT/EP2016/067702 dated Oct. 20, 2016.

Final Office Action issued for U.S. Appl. No. 15/229,284 dated Aug. 28, 2018.

Office Action issued Dec. 12, 2018 for co-pending U.S. Appl. No. 15,229,284.

Notice of Allowance dated Sep. 30, 2019, issued in corresponding Russian Application No. 2017145944.

Decision to Grant and Search Report dated Oct. 31, 2019, issued in corresponding Russian Application No. 2017144174.

Office Action dated Mar. 27, 2020, issued in corresponding Chinese Patent Application No. 20160038587.2.

Office Action dated Apr. 26, 2020, issued in corresponding Chinese Patent Application No. 201680038519.6.

Office Action dated Sep. 28, 2020, issued in corresponding Japanese Patent Application No. 2017-567157.

Office Action dated Sep. 22, 2020, issued in corresponding Israeli Patent Application No. 255776.

Office Action dated Sep. 29, 2020, issued in corresponding Israeli Patent Application No. 255736.

Office Action dated Sep. 28, 2020, issued in corresponding Japanese Patent Application No. P 2018-504976.

Notice of Opposition dated Nov. 26, 2020, issued in corresponding European Patent No. 3331387.

International Preliminary Report on Patentability for PCT/EP2016/067702 dated Jul. 19, 2017.

Office Action dated Nov. 20, 2020, issued in corresponding Chinese Patent Application No. 201680038519.6.

Office Action dated Nov. 26, 2020, issued in corresponding Chinese Patent Application No. 201680038587.2.

Office Action dated May 7, 2021, issued in corresponding Japanese Patent Application No. 2017-567157.

Office Action dated Jul. 5, 2021 issued in corresponding Japanese Patent Application No. 2018-504976.

"Bopp Stainless Steel Wire Cloth" downloaded from http://www.saatiamericas.com/images/printing/mesh/bopp-wire.pdf on Aug. 19, 2021 (Year: 2021).

Office Action dated Oct. 20, 2021, issued in corresponding U.S. Appl. No. 16/553,754.

Decision to Grant dated Dec. 14, 2021, issued in corresponding Japanese Patent Application No. 2017-567157.

Decision to Grant dated Jan. 31, 2022, issued in corresponding Japanese Patent Application No. 2018-504976.

Notice of Allowance dated Mar. 23, 2022, issued in corresponding U.S. Appl. No. 16/553,754.

Communication to the Opposition Division dated Jun. 24, 2021, issued in corresponding European Patent Application No. 16745678.9 / European Patent No. 3331387.

Communication to the Opposition Division dated Apr. 11, 2022, issued in corresponding European Patent Application No. 16745678.9 / European Patent No. 3331387.

Notice of Allowance dated Jun. 16, 2022, issued in corresponding U.S. Appl. No. 16/553,754.

Decision Rejecting the Opposition dated Jul. 21, 2022, issued in corresponding European Patent Application No. 16745678.9 / European Patent No. 3331387.

(56) References Cited

OTHER PUBLICATIONS

Office Action dated Mar. 27, 2023, issued in corresponding U.S. Appl. No. 17/961,998.
Office Action dated Mar. 28, 2023, issued in corresponding U.S. Appl. No. 18/051,173.
Office Action dated Aug. 25, 2023, issued in corresponding U.S. Appl. No. 18/051,173.
Office Action dated Sep. 12, 2023, issued in corresponding U.S. Appl. No. 17/961,998.
Final Office Action, dated Jan. 18, 2024, issued in U.S. Appl. No. 18/051,173.
Notice of Allowance, dated Jan. 10, 2024, issued in U.S. Appl. No. 17/961,998.
Notice of Allowance, dated Feb. 21, 2024, issued in U.S. Appl. No. 18/051,173.
Korean Notice of Allowance, dated Jan. 30, 2024, issued in Korean Patent Application No. 10-2017-7037296.
Non-Final Office Action dated Apr. 28, 2026, issued in corresponding U.S. Appl. No. 18/731,897.

* cited by examiner

ASSEMBLY WITH CAPILLARY MEDIUM AND AIR IMPINGEMENT STRUCTURE DEFINING FIRST OPENING

CROSS-REFERENCE TO RELATED APPLICATION

This is a continuation of U.S. application Ser. No. 17/961,998, filed on Oct. 7, 2022, which is a divisional of U.S. application Ser. No. 16/369,977, filed on Mar. 29, 2019, which is a continuation of U.S. application Ser. No. 15/229,266, filed on Aug. 5, 2016, which is a continuation of and claims priority to PCT/EP2016/067702 filed on Jul. 25, 2016, and further claims priority to EP 15180209.7 filed on Aug. 7, 2015, each of which are hereby incorporated by reference in their entirety.

BACKGROUND

Some embodiments relate to aerosol-generating systems that comprise a heater assembly suitable for vaporising a liquid soaked from a capillary medium. In particular, some embodiments relate to handheld aerosol-generating systems, such as electrically operated vaping systems.

One type of aerosol-generating system is an electrically operated vaping system. Handheld electrically operated vaping systems consisting of a device portion comprising a battery and control electronics, a cartridge portion comprising a supply of aerosol-forming substrate, and an electrically operated vaporizer, are known. A cartridge comprising both a supply of aerosol-forming substrate and a vaporiser is sometimes referred to as a "cartomizer". The vaporiser typically comprises a coil of heater wire wound around an elongate wick soaked in liquid aerosol-forming substrate. The cartridge portion typically comprises not only the supply of aerosol-forming substrate and an electrically operated vaporiser, but also a mouthpiece, which the adult vaper sucks on in use to draw aerosol into their mouth.

SUMMARY

At least one embodiment is directed to an aerosol-generating system which offers improved aerosolization and better aerosol droplet growth and which avoids occurrence of hot spots especially in the middle part of the heater assembly.

It would be desirable to provide an aerosol-generating system that improves the airflow on the surface of the heater assembly to encourage the mixing of the volatized vapors. It would be further desirable to provide an aerosol-generating system that accelerates the airflow of the aerosol from the heater assembly towards the mouthpiece, thereby further improving the aerosolization through faster cooling of the volatized vapors. In embodiments, enhanced mixing and acceleration of airflow is achieved by the introduction of turbulence and vortices.

In one embodiment, an aerosol-generating system comprises a liquid storage portion comprising a housing holding a liquid aerosol-forming substrate and a capillary medium, the housing having an opening. A fluid permeable heater assembly comprising an arrangement of electrically conductive filament is arranged to define an air impingement surface, wherein the fluid permeable heater assembly extends across the opening of the housing, and wherein the filament arrangement defines a filament opening allowing airflow to pass through. The capillary medium is provided in contact with the heater assembly. The capillary medium is configured to draw the liquid aerosol forming substrate to the electrically conductive filament arrangement. The capillary medium comprises a capillary medium opening extending the filament opening through the capillary medium.

At least one embodiment is further directed to a method of manufacture of a cartridge for use in an electrically operated aerosol-generating system. In one embodiment, the method comprises the steps of providing a liquid storage portion comprising a housing having an opening, providing a capillary material within the liquid storage portion, filling the liquid storage portion with liquid aerosol-forming substrate and providing a fluid permeable heater assembly comprising an arrangement of electrically conductive filaments arranged to define an air impingement surface, wherein the fluid permeable heater assembly extends across the opening of the housing, and wherein the filament arrangement defines a filament opening allowing airflow to pass through. The capillary medium is provided in contact with the heater assembly and the capillary medium comprises a capillary medium opening allowing airflow to pass through the capillary medium.

The provision of a heater assembly that extends across an opening of a liquid storage portion allows for a robust construction that is relatively simple to manufacture. This arrangement allows for a large contact area between the heater assembly and liquid aerosol-forming substrate. The housing may be a rigid housing. As used herein "rigid housing" means a housing that is self-supporting. The rigid housing of the liquid storage portion provides mechanical support to the heater assembly.

The heater assembly may be substantially flat allowing for simple manufacture. As used herein, "substantially flat" means formed initially in a single plane and not wrapped around or other conformed to fit a curved or other non-planar shape. Geometrically, the term "substantially flat" electrically conductive filament arrangement is used to refer to an electrically conductive filament arrangement that is in the form of a substantially two dimensional topological contour or profile. Thus, the substantially flat electrically conductive filament arrangement extends in two dimensions along a surface substantially more than in a third dimension. In particular, the dimensions of the substantially flat filament arrangement in the two dimensions within the surface is at least 5 times larger than in the third dimension, normal to the surface. An example of a substantially flat filament arrangement is a structure between two substantially imaginary parallel surfaces, wherein the distance between these two imaginary surfaces is substantially smaller than the extension within the surfaces.

The term "filament" is used throughout the specification to refer to an electrical path arranged between two electrical contacts. A filament may arbitrarily branch off and diverge into several paths or filaments, respectively, or may converge from several electrical paths into one path. A filament may have a round, square, flat or any other form of cross-section. A filament may be arranged in a straight or curved manner.

The phrases "filament arrangement" or "arrangement of filaments" are used interchangeably throughout the specification to refer to an arrangement of a plurality of filaments. The filament arrangement may be an array of filaments, for example arranged parallel to each other. The filaments may form a mesh. The mesh may be woven or non-woven. Throughout the specification, the surface of the filament arrangement that is in contact with the air flow is also referred to as "air impingement surface" of the filament arrangement.

The electrically conductive filaments may define interstices between the filaments and the interstices may have a width of between 10 micrometer and 100 micrometer. The filaments may give rise to capillary action in the interstices, so that in use, liquid to be vaporised is drawn into the interstices, increasing the contact area between the heater assembly and the liquid.

By providing the filament arrangement with a plurality of interstices for allowing fluid to pass through the filament arrangement, the filament arrangement is fluid permeable. This means that the aerosol-forming substrate, in a gaseous phase and possibly in a liquid phase, can readily pass through the filament arrangement and, thus, the heater assembly.

The substantially flat filament arrangement is configured for customizing the airflow around the air impingement surface. This is done by introducing turbulences and vortexes which encourage the mixing of volatized vapors and leading to enhanced aerosolization.

In some embodiments, the filament arrangement may be of planar shape, defining a planar air impingement surface.

In some embodiments, an initially substantially flat arrangement of filaments is deformed, shaped or otherwise modified to define an arrangement of filaments which define a non-planar air impingement surface. In an embodiment, an initially substantially flat filament arrangement is formed so that it is curved along one or more dimensions, for example forming a convex or "dome" shape, a concave shape, a bridge shape, or a cyclone or "funnel" shape. In an embodiment, the filament arrangement defines a concave surface which faces the airflow that arrives at and impinges upon the filament arrangement. The non-planar-shape of the filament arrangement encourages the introduction of turbulences and vortexes onto the airflow arriving at the filament arrangement. Position and shape of the filament arrangement are arranged such that an airflow guided to the air impingement surface of the filament arrangement is whirled around the air impingement surface.

The filament arrangement defines a filament opening allowing airflow to pass through. The capillary medium opening may extend the filament opening to form an air duct through the capillary medium. Position and shape of the filament arrangement, of the filament opening, and of the capillary medium opening are dimensioned and arranged such that an airflow guided to the air impingement surface of the filament arrangement is whirled around the air impingement surface.

The filament opening is substantially larger than the interstices between the filaments of the filament arrangement. Substantially larger means that the filament opening covers an area that is at least 5 times larger, or at least 10 times larger, or at least 50 times larger, or at least 100 times larger than the area of an interstice between two filaments. The relation of the area of the filament opening and the cross-section area of the filament arrangement including the filament opening may be at least 1 percent, or at least 2 percent, or at least 3 percent, or at least 4 percent, or at least 5 percent, or at least 10 percent, or at least 25 percent.

The position of the filament opening substantially may match the position of the capillary medium opening. Shape and size of the cross section of the filament opening may be the shape and size of the cross section of the capillary medium opening.

The heater assembly and the capillary medium may be arranged in an aerosol-generating system in such a way that at least a portion of the airflow that arrives at the air impingement surface of the filament arrangement is guided through an air duct defined by the capillary medium opening through the capillary medium. The airflow through the air duct is accelerated by the suction or draw of the air duct, thereby improving aerosolization through faster cooling of the volatized vapors.

Alternatively, the heater assembly and the capillary medium may be arranged such in an aerosol-generating system that the airflow arriving at the air impingement surface of the filament arrangement is guided through the air duct defined by the capillary medium opening through the capillary medium.

The electrically conductive filaments may form a mesh of size between 160 and 600 Mesh US (+/−10 percent) (i.e. between 160 and 600 filaments per inch (+/−10 percent)). The width of the interstices is preferably between 75 micrometer and 25 micrometer. The percentage of open area of the mesh, which is the ratio of the area of the interstices to the total area of the mesh is preferably between 25 percent and 56 percent. The mesh may be formed using different types of weave or lattice structures. Alternatively, the electrically conductive filaments include an array of filaments arranged parallel to one another. The mesh, array or fabric of electrically conductive filaments may also be characterised by its ability to retain liquid, as is well understood in the art.

The electrically conductive filaments may have a diameter of between 10 micrometer and 100 micrometer, preferably between 8 micrometer and 50 micrometer, and more preferably between 8 micrometer and 39 micrometer. The filaments may have a round cross section or may have a flattened cross-section.

The area of the mesh, array or fabric of electrically conductive filaments may be small, preferably less than or equal to 25 square millimeter, allowing it to be incorporated in a handheld system. The mesh, array or fabric of electrically conductive filaments may, for example, be circular with a diameter of 3 millimeter to 10 millimeter, preferably 5 millimeter. The mesh may also be rectangular and, for example, have dimensions of 5 millimeter by 2 millimeter. Preferably, the mesh or array of electrically conductive filaments covers an area of between 10 percent and 50 percent of the area of the heater assembly. More preferably, the mesh or array of electrically conductive filaments covers an area of between 15 percent and 25 percent of the area of the heater assembly. Sizing of the mesh, array or fabric of electrically conductive filaments 10 percent and 50 percent of the area, or less or equal than 25 millimeter2, reduces the amount of total power required to heat the mesh, array or fabric of electrically conductive filaments while still ensuring sufficient contact of the mesh, array or fabric of electrically conductive filaments to the liquid provided one or more capillary mediums to be volatilized.

The heater filaments may be formed by etching a sheet material, such as a foil. This may be particularly advantageous when the heater assembly comprises an array of parallel filaments. If the heater assembly comprises a mesh or fabric of filaments, the filaments may be individually formed and knitted together. Alternatively, the heater filaments may be stamped from electrically conductive foil, as for example stainless steel.

The filaments of the heater assembly may be formed from any material with suitable electrical properties. Suitable materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, constantan, nickel-, cobalt-, chromium-, aluminium-titanium-zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminium based alloys and iron-manganese-aluminium based alloys. Timetal® is a registered trade mark of Titanium Metals Corporation. The filaments may be coated with one or more insulators. Preferred materials for the electrically conductive filaments are 304, 316, 304L, 316L stainless steel, and graphite. Additionally, the electrically conductive filament arrangement may comprise combinations of the above materials. A combination of materials may be used to improve the control of the resistance of the substantially flat filament arrangement. For example, materials with a high intrinsic resistance may be combined with materials with a low intrinsic resistance. This may be advantageous if one of the materials is more beneficial from other perspectives, for example price, machinability or other physical and chemical parameters. Advantageously, a substantially flat filament arrangement with increased resistance reduces parasitic losses. Advantageously, high resistivity heaters allow more efficient use of battery energy. The battery energy is proportionally divided between the energy lost on the printed circuit board and the contacts and energy delivered to the electrically conductive filament arrangement. Thus the energy available for the electrically conductive filament arrangement in the heater is higher the higher the resistance of the electrically conductive filament arrangement.

Alternatively, the electrically conductive filament arrangement may be formed of carbon thread textile. Carbon thread textile has the advantage that it is typically more cost efficient than metallic heaters with high resistivity. Further, a carbon thread textile is typically more flexible than a metallic mesh. Another advantage is that the contact between a carbon thread textile and a transport medium like a high release material can be well preserved during construction of the fluid permeable heater assembly.

A reliable contact between the fluid permeable heater assembly and a transport medium, like for example a capillary transport medium such as a wick made from fibres or a porous ceramic material, improves the constant wetting of the fluid permeable heater assembly. This advantageously reduces the risk of overheating of the electrically conductive filament arrangement and inadvertent thermal decomposition of the liquid.

The heater assembly may comprise an electrically insulating substrate on which the filaments are supported. The electrically insulating substrate may comprise any suitable material, and may be a material that is able to tolerate high temperatures (in excess of 300 degrees Celsius) and rapid temperature changes. An example of a suitable material is a polyimide film, such as Kapton®. The electrically insulating substrate may have an aperture formed in it, with the electrically conductive filaments extending across the aperture. The heater assembly may comprise electrical contacts connected to the electrically conductive filaments. For example, the electrical contacts may be glued, welded or mechanically clamped to the electrically conductive filament arrangement. Alternatively the electrically conductive filament arrangement may be printed on the electrically insulating substrate, for example using metallic inks. In such an arrangement, the electrically insulating substrate may be a porous material, such that the electrically conductive filament arrangement can be directly applied to the surface of the porous material. In such an embodiment the porosity of the substrate functions as the "opening" of the electrically insulating substrate through which a liquid may be drawn towards the electrically conductive filament arrangement.

The electrical resistance of the mesh, array or fabric of electrically conductive filaments of the filament arrangement is between 0.3 Ohms and 4 Ohms. Preferably, the electrical resistance of the mesh, array or fabric of electrically conductive filaments is between 0.5 Ohms and 3 Ohms, and more preferably about 1 Ohm. In one embodiment, the electrical resistance of the mesh, array or fabric of electrically conductive filaments is at least an order of magnitude, and more preferably at least two orders of magnitude, greater than the electrical resistance of the contact portions. This ensures that the heat generated by passing current through the filament arrangement is localised to the mesh or array of electrically conductive filaments. It is advantageous to have a low overall resistance for the filament arrangement if the system is powered by a battery. A low resistance, high current system allows for the delivery of high power to the filament arrangement. This allows the filament arrangement to heat the electrically conductive filaments to a desired temperature quickly.

The first and second electrically conductive contact portions may be fixed directly to the electrically conductive filaments. The contact portions may be positioned between the electrically conductive filaments and the electrically insulating substrate. For example, the contact portions may be formed from a copper foil that is plated onto the insulating substrate. The contact portions may also bond more readily with the filaments than the insulating substrate would.

In some embodiments a first electrically conductive contact portion may be located at an interior boundary line of the filament arrangement to the filament opening. The first electrically conductive contact portion may be guided through the capillary medium opening. A second electrically conductive contact portion may be located at an exterior boundary line of the filament arrangement.

Alternatively or additionally, the first and second electrically conductive contact portions may be integral with the electrically conductive filaments. For example, the filament arrangement may be formed by etching a conductive sheet to provide a plurality of filaments between two contact portions.

The housing of the liquid storage portion contains a capillary medium. A capillary medium is a material that actively conveys liquid from one end of the material to another. The capillary medium is advantageously oriented in the housing to convey liquid to the heater assembly.

The capillary medium may have a fibrous or spongy structure. The capillary medium may comprise a bundle of capillaries. For example, the capillary medium may comprise a plurality of fibres or threads or other fine bore tubes. The fibres or threads may be generally aligned to convey liquid to the heater. Alternatively, the capillary medium may comprise sponge-like or foam-like material. The structure of the capillary medium forms a plurality of small bores or tubes, through which the liquid can be transported by capillary action. The capillary medium may comprise any suitable material or combination of materials. Examples of suitable materials are a sponge or foam material, ceramic- or graphite-based materials in the form of fibres or sintered powders, foamed metal or plastics material, a fibrous material, for example made of spun or extruded fibres, such as cellulose acetate, polyester, or bonded polyolefin, polyethylene, terylene or polypropylene fibres, nylon fibres or ceramic. The capillary medium may have any suitable capillarity and porosity so as to be used with different liquid physical properties. The liquid has physical properties, including but not limited to viscosity, surface tension, density, thermal conductivity, boiling point and vapour pressure, which allow the liquid to be transported through the capillary device by capillary action.

The capillary medium is in contact with the electrically conductive filaments. The capillary medium may extend into interstices between the filaments. The heater assembly may draw liquid aerosol-forming substrate into the interstices by capillary action. The capillary medium may be in contact with the electrically conductive filaments over substantially the entire extent of the aperture. In one embodiment the capillary medium in contact with the electrically conductive filament arrangement may be a filamentary wick.

Advantageously, the heater assembly and the capillary medium may be sized to have approximately the same area. As used here, approximately means between that the heater assembly may be between 0-15 percent larger than the capillary medium. The shape of the heater assembly may also be similar to the shape of the capillary medium such that the assembly and the material substantially overlap. When the assembly and the material are substantially similar in size and shape, manufacturing can be simplified and the robustness of the manufacturing process improved. As discussed below, the capillary medium may include two or more capillary mediums including one or more layers of the capillary medium directly in contact with the mesh, array or fabric of electrically conductive filaments of the heater assembly in order to promote aerosol generation. The capillary mediums may include materials described herein.

At least one of the capillary mediums may be of sufficient volume in order to ensure that a minimal amount of liquid is present in said capillary medium to prevent "dry heating", which occurs if insufficient liquid is provided to the capillary medium in contact with the mesh, array or fabric of electrically conductive filaments. A minimum volume of said capillary medium may be provided in order to allow for between 20-40 puffs by the adult vaper. An average volume of liquid volatilized during a puff of a length between 1-4 seconds is typically between 1-4 milligrams of liquid. Thus, providing at least one capillary medium having a volume to retain between 20-160 milligrams of the liquid comprising the liquid-forming substrate may prevent the dry heating.

The housing may contain two or more different materials as capillary medium, wherein a first capillary medium, in contact with the filament arrangement, has a higher thermal decomposition temperature and a second capillary medium, in contact with the first capillary medium but not in contact with the filament arrangement has a lower thermal decomposition temperature. The first capillary medium effectively acts as a spacer separating the filament arrangement from the second capillary medium so that the second capillary medium is not exposed to temperatures above its thermal decomposition temperature. As used herein, "thermal decomposition temperature" means the temperature at which a material begins to decompose and lose mass by generation of gaseous by-products. The second capillary medium may advantageously occupy a greater volume than the first capillary medium and may hold more aerosol-forming substrate that the first capillary medium. The second capillary medium may have superior wicking performance to the first capillary medium. The second capillary medium may be cheaper than the first capillary medium. The second capillary medium may be polypropylene.

The first capillary medium may separate the heater assembly from the second capillary medium by a distance of at least 1.5 millimeter, and preferably between 1.5 millimeter and 2 millimeter in order to provide a sufficient temperature drop across the first capillary medium.

The size and position of the capillary medium opening can be selected based on the airflow characteristics of the aerosol-generating system, or on the temperature profile of the heater assembly, or both. Position and shape of the capillary medium opening are arranged such that an airflow guided to the air impingement surface of the filament arrangement is whirled around the air impingement surface. In some embodiments, the capillary medium opening may be positioned towards the center of the cross section of the capillary medium. In one embodiment, the capillary medium opening is positioned in the center of the cross section of the capillary medium. In one embodiment, the capillary medium is of cylindrical shape. In one embodiment, the air duct through the capillary medium opening is of cylindrical shape.

The term "towards the center of the cross section of capillary medium" refers to a center portion of the cross section of the capillary medium that is away from the periphery of the capillary medium and has an area which is less than the total area of the cross section of the capillary medium. For example, the center portion may have an area of less than about 80 percent, less than about 60 percent, less than about 40 percent, or less than about 20 percent of the total area of the cross section of the capillary medium.

The filament opening may be positioned in a center portion of the filament arrangement, wherein the filament opening is extended by the capillary medium opening to form an air duct through the capillary medium. In this case, more aerosol passes through the filament arrangement in the center of the filament arrangement. This is advantageous in aerosol-generating systems in which the center of the filament arrangement is the more important vaporization area, for example in aerosol-generating systems in which the temperature of the heater assembly is higher in the center of the filament arrangement. Position and shape of the filament arrangement, of the filament opening, and of the capillary medium opening are arranged such that an airflow guided to the air impingement surface of the filament arrangement is whirled around the air impingement surface.

As used herein, the term "center portion" of the filament arrangement refers to a part of the filament arrangement that is away from the periphery of the filament arrangement and has an area which is less than the total area of the filament arrangement. For example, the center portion may have an area of less than about 80 percent, less than about 60 percent, less than about 40 percent, or less than about 20 percent of the total area of the filament arrangement.

An air inlet of the aerosol-generating system may be arranged in a main housing of the system. Ambient air is directed into the system and is guided to the air impingement surface of the heating assembly. The air stream arriving at the air impingement surface of the heater assembly is guided through the air duct defined by the capillary medium opening. The airflow entrains aerosols caused by heating the aerosol-forming substrate on the surface of the heater assembly. The aerosol containing air may then be guided along the cartridge between a cartridge housing and a main housing to the downstream end of the system, where it is mixed with ambient air from the further flow route (either before or upon reaching the downstream end). Guiding the aerosol through the air duct accelerates the airflow, thereby improving aerosolization through faster cooling.

The air inlets may be provided at the sidewalls of the main housing of the system, such that ambient air may be drawn towards the heating element at an angle of approximately or up to 90° with respect to the air duct defined by the capillary medium opening. Thus, at least a large part of air flow is guided substantially parallel along the air impingement surface of the heater assembly and is then redirected into the air duct defined by the capillary medium. By the specific air flow routing, turbulences and vortices are created in the airflow, which efficiently carries the aerosol vapours. Further, the cooling rate may be increased which may also enhance aerosol formation.

The ambient air may also be guided through the air duct to the surface of the heater assembly, e.g., the direction of airflow may be inverted as compared to the preferred direction of airflow. Also in this embodiment, guiding the ambient air through the air duct accelerates the airflow, thereby improving aerosolization.

An inlet opening of the second channel arranged in a region of a distal end of a cartridge housing may also be provided in an alternative system where a heating element is arranged at a proximal end of the cartridge. The second flow route may not only pass outside of the cartridge but also through the cartridge. Ambient air then enters the cartridge at a semi-open wall of the cartridge, passes through the cartridge and leaves the cartridge by passing though the heating element arranged at the proximal end of the cartridge. Thereby, ambient air may pass through the aerosol-forming substrate or through one or several channels arranged in a solid aerosol-forming substrate such that ambient air does not pass through the substrate itself but in the channels next to the substrate.

For allowing ambient air to enter a cartridge, a wall of the cartridge housing, for example, a wall opposite the heating element, for example a bottom wall, is provided with at least one semi-open inlet. The semi-open inlet allows air to enter the cartridge but no air or liquid to leave the cartridge through the semi-open inlet. A semi-open inlet may for example be a semi-permeable membrane, permeable in one direction only for air but is air- and liquid-tight in the opposite direction. A semi-open inlet may for example also be a one-way valve. Preferably the semi-open inlets allow air to pass through the inlet only if specific conditions are met, for example a minimum depression in the cartridge or a volume of air passing through the valve or membrane.

Such one-way valves may, for example, be commercially available valves, such as for example used in medical devices, for example LMS Mediflow One-Way, LMS SureFlow One-Way or LMS Check Valves (crosses membranes). Suitable membranes to be used for a cartridge having an airflow passing through the cartridge, are for example vented membranes as used in medical devices, for example Qosina Ref. 11066, vented cap with hydrophobic filter or valves as used in baby bottles. Such valves and membranes may be made of any material suitable for applications in electrically heated vaping systems. Materials suitable for medical devices and FDA approved materials may be used; for example Graphene having very high mechanical resistance and thermal stability within a large range of temperatures. Preferably, valves are made of soft resilient material for supporting a liquid-tight incorporation of the one or several valves into a wall of the container housing.

Letting ambient air pass through the substrate supports an aerosolization of the aerosol-forming substrate. During puffing, a depression occurs in the cartridge, which may activate the semi-open inlets. Ambient air then passes the cartridge, preferably a high retention or high release material (HRM) or a liquid, for example, and crosses the heating element, thereby creating and sustaining aerosolization of the liquid, when the heating element sufficiently heats the liquid. In addition, due to the depression caused during puffing, a supply of liquid in a transport material such as a capillary medium to the heating element may be limited. An ambient airflow through the cartridge may equalize pressure differences within the cartridge and thereby support an unhindered capillary action towards the heating element.

A semi-open inlet may, in addition, or alternatively also be provided in one or several side walls of the cartridge housing. Semi-open inlets in side walls provide a lateral airflow into the cartridge towards the open top end of the cartridge housing, where the heating element is arranged. In one embodiment, lateral airflows pass through the aerosol-forming substrate.

The system may further comprise electric circuitry connected to the heater assembly and to an electrical power source, the electric circuitry is configured to monitor the electrical resistance of the heater assembly or of one or more filaments of the heater assembly, and to control the supply of power to the heater assembly dependent on the electrical resistance of the heater assembly or the one or more filaments.

The electric circuitry may comprise a microprocessor, which may be a programmable microprocessor. The electric circuitry may comprise further electronic components. The electric circuitry may be configured to regulate a supply of power to the heater assembly. Power may be supplied to the heater assembly continuously following activation of the system or may be supplied intermittently, such as on a puff-by-puff basis. The power may be supplied to the heater assembly in the form of pulses of electrical current.

The system advantageously comprises a power supply, typically a battery, within the main body of the housing. As an alternative, the power supply may be another form of charge storage device such as a capacitor. The power supply may require recharging and may have a capacity that allows for the storage of enough energy for one or more vaping experiences; for example, the power supply may have sufficient capacity to allow for the continuous generation of aerosol for a period of around six minutes or for a period that is a multiple of six minutes. In another example, the power supply may have sufficient capacity to allow for a desired (or, alternative a predetermined) number of puffs or discrete activations of the heater assembly.

In one embodiment, the aerosol generating system comprises a housing. In one embodiment, the housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. In one embodiment, the material is light and non-brittle.

The aerosol-forming substrate is a substrate capable of releasing volatile compounds that can form an aerosol. The volatile compounds may be released by heating the aerosol-forming substrate. The aerosol-forming substrate may comprise plant-based material. The aerosol-forming substrate may comprise tobacco. The aerosol-forming substrate may comprise a tobacco-containing material containing volatile tobacco flavour compounds, which are released from the aerosol-forming substrate upon heating. The aerosol-forming substrate may alternatively comprise a non-tobacco-containing material. The aerosol-forming substrate may comprise homogenised plant-based material. The aerosol-forming substrate may comprise homogenised tobacco material. The aerosol-forming substrate may comprise at least one aerosol-former. The aerosol-forming substrate may comprise other additives and ingredients, such as flavourants.

The aerosol-generating system may comprise a main unit and a cartridge that is removably coupled to the main unit, wherein the liquid storage portion and heater assembly are provided in the cartridge and the main unit comprises a power supply.

The aerosol-generating system may be an electrically operated vaping system. In one embodiment, the aerosol-generating system is portable. The aerosol-generating system may have a size comparable to a conventional cigar or cigarette. The vaping system may have a total length between approximately 30 millimeter and approximately 150 millimeter. The vaping system may have an external diameter between approximately 5 millimeter and approximately 30 millimeter.

In the method of manufacture of a cartridge for use in an electrically operated aerosol-generating system, the filling of the liquid storage portion may be performed before or after providing the heater assembly. The heater assembly may be fixed to the housing of the liquid storage portion. The fixing may, for example, comprise heat sealing, gluing or welding the heater assembly to the housing of the liquid storage portion.

Features described in relation to one aspect may equally be applied to other aspects of the embodiments.

As used herein, "electrically conductive" means formed from a material having a resistivity of 1×10−4 Ohm meters, or less.

As used herein, "electrically insulating" means formed from a material having a resistivity of 1×104 Ohm meters or more.

As used herein "fluid permeable" in relation to a heater assembly means that the aerosol-forming substrate, in a gaseous phase and possibly in a liquid phase, can readily pass through the heater assembly.

BRIEF DESCRIPTION OF THE DRAWINGS

Embodiments will now be described, by way of example only, with reference to the accompanying drawings, in which.

DETAILED DESCRIPTION

Figure 1:
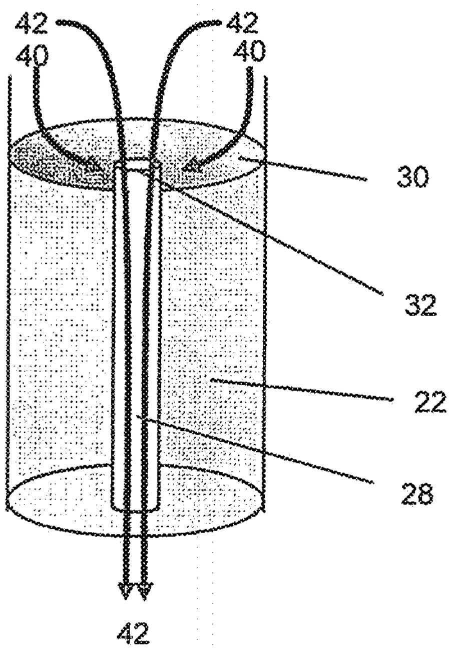
FIG. 1 is a perspective topside view of an arrangement comprising a heater assembly and a capillary medium, in accordance with an embodiment.

Various example embodiments will now be described more fully with reference to the accompanying drawings in which some example embodiments are shown. However, specific structural and functional details disclosed herein are merely representative for purposes of describing example embodiments. Thus, the embodiments may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various features will be described in detail with reference to the attached drawings. However, example embodiments described are not limited thereto.

FIG. 1 shows a filament arrangement 30 according to one of the embodiments of the present disclosure. The filament arrangement has a filament opening 32. A capillary medium 22 is in contact with the filament arrangement 30. The capillary medium has a capillary medium opening 28 that acts as an air duct through the capillary medium 22. Ambient air is guided in airflow 40 to the air impingement surface of the filament arrangement 30. The suction of the air duct through the capillary medium 22 causes an acceleration of the airflow so that the volatized vapors are drawn in an airflow 42 through the air duct.

Figure 2A:
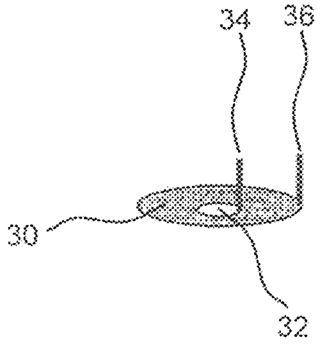
FIG. 2A is a perspective topside view of a heater assembly comprising a filament arrangement of planar shape with a central opening.
Figure 2B:
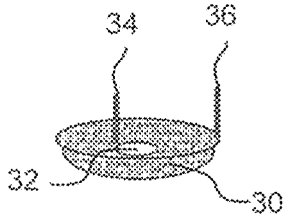
FIG. 2B is a perspective topside view of a heater assembly comprising a filament arrangement of curved shape with a central opening.
Figure 2C:
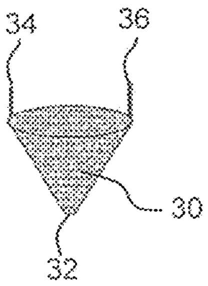
FIG. 2C is a perspective topside view of a heater assembly comprising a filament arrangement of funnel shape with a central opening.

FIGS. 2A to 2C illustrate various shapes of filament arrangements 30, each having a filament opening 32 in a center portion of the filament arrangement 30.

FIG. 2A shows a planar filament arrangement 30. Turbulences and vortexes of the airflow 40 on the air impingement surface of the filament arrangement are caused by the central opening acting as an entrance to the air duct of the capillary medium opening 28.

FIG. 2B shows a non-planar filament arrangement 30 that is curved along one dimension. The curved shape causes a whirling of the airflow 40 on the air impingement surface. This effect is further increased by the optional filament opening 32.

FIG. 2C shows a non-planar filament arrangement 30 having a funnel shape with an optional filament opening 32 at the bottom of the funnel shaped filament arrangement 30. The funnel shape causes a whirling of the airflow 40 on the air impingement surface. This effect is further increased by the optional filament opening 32.

Figure 3:
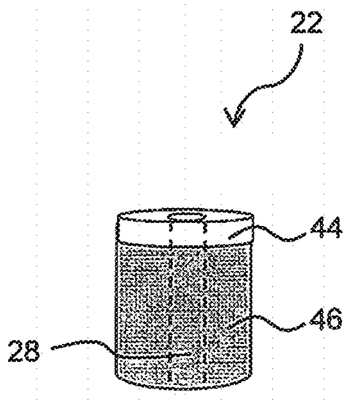
FIG. 3 is a perspective topside view of a capillary medium comprising a first capillary medium and a second capillary medium with both having a central opening.

FIG. 3 shows a capillary medium 22 to be used in an aerosol-generating system. There are two separate capillary mediums 44, 46 in use. A larger body of a second capillary medium 46 is provided on an opposite side of the first capillary medium 44 that is in contact with the filament arrangement 30 of the heater assembly. Both the first capillary medium 44 and the second capillary medium 46 retain liquid aerosol-forming substrate. The first capillary medium 44, which contacts the filament arrangement, has a higher thermal decomposition temperature (at least 160 degrees Celsius or higher such as approximately 250 degrees Celsius) than the second capillary medium 46. The first capillary medium 44 effectively acts as a spacer separating the filament arrangement 30 from the second capillary medium 46 so that the second capillary medium is not exposed to temperatures above its thermal decomposition temperature. The first capillary medium 44 is flexible and preferably accommodates to the non-planar shape of the heater assembly, such that the contact surface between the capillary medium and the heater assembly is maximized.

The thermal gradient across the first capillary medium is such that the second capillary medium is exposed to temperatures below its thermal decomposition temperature. The second capillary medium 46 may be chosen to have superior wicking performance to the first capillary medium 44, may retain more liquid per unit volume than the first capillary medium and may be less expensive than the first capillary medium. The capillary medium 22 comprises a capillary medium opening 28 acting as an air duct through the capillary medium 22.

Figure 4A:
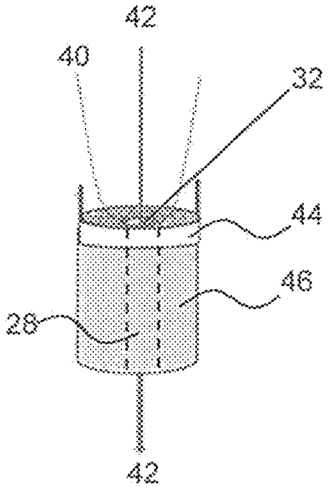
FIG. 4A is a perspective topside view of an arrangement comprising a heater assembly and a capillary medium, in accordance with an embodiment.
Figure 4B:
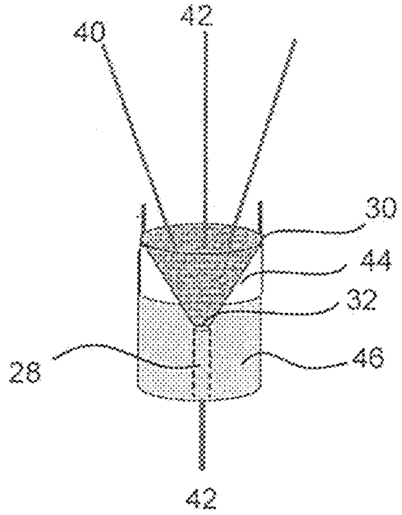
FIG. 4B is a perspective topside view of an arrangement comprising a heater assembly and a capillary medium, in accordance with an embodiment.

FIGS. 4A and 4B illustrate the combination of a filament arrangement 30 with two separate capillary mediums 44, 46 that guide the airflow 42 through an air duct defined by the capillary medium opening 28 after being mixed with volatized vapors on the surface of the filament arrangement 30.

Alternatively, the airflow may be guided in the reverse direction, i.e. the ambient air may be guided as airflow 40 through the air duct to the surface of the filament arrangement 30.

FIG. 4A shows a planar filament arrangement 30 with a filament opening 32 that extends the capillary medium opening 28. The air duct through the capillary mediums 44, 46 accelerates the airflow and improves aerosolization.

FIG. 4B shows a non-planar filament arrangement 30 of a funnel shape with a filament opening 32 at the bottom end of the filament arrangement 30, the filament opening 32 extending the capillary medium opening 28. The funnel shape creates turbulences and vortexes that encourage the mixing of the volatized vapors with the ambient air.

In the embodiment depicted in FIG. 4B the lower portion of the filament arrangement 30 is in direct contact with the second capillary medium 46. Of course the size of capillary medium 44 can also be increased, such that it covers the complete filament arrangement 30, and such that direct contact between the filament arrangement 30 and the second capillary medium 46 is prevented.

Figure 5:
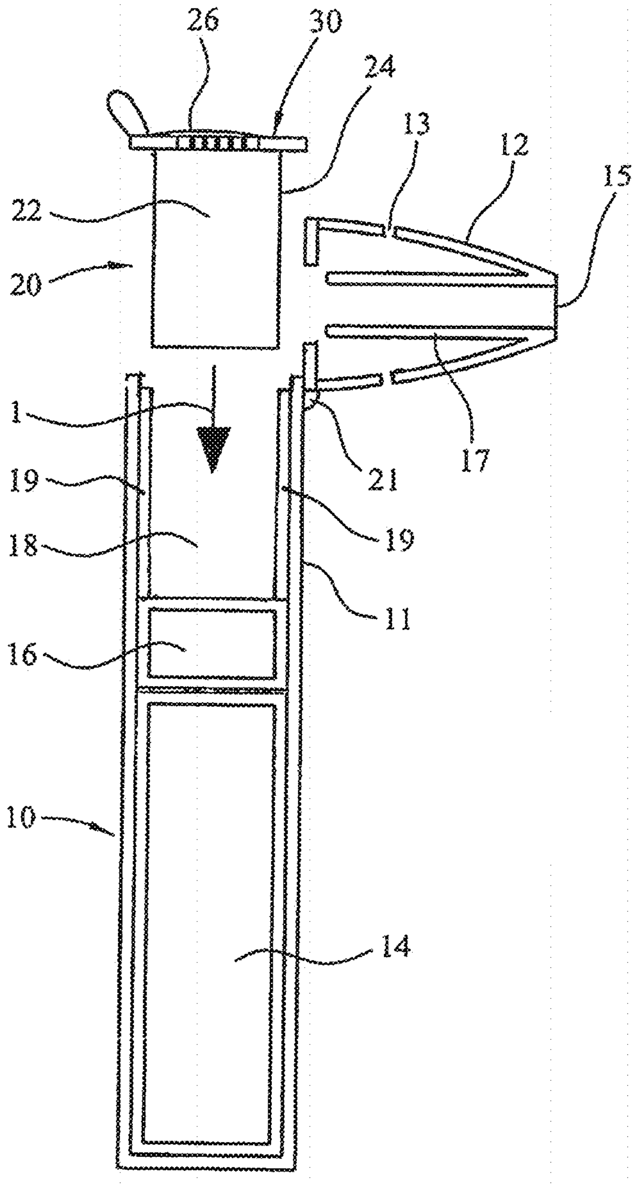
FIG. 5 is a schematic illustration of a system, incorporating a cartridge comprising a heater assembly and a capillary medium, in accordance with an embodiment.

FIG. 5 is a schematic illustration of an aerosol-generating system, including a cartridge 20 with a heater assembly comprising a filament arrangement 30 according to one of the embodiments of the present disclosure and with a capillary medium 22 according to one of the embodiments of the present disclosure. The aerosol-generating system comprises an aerosol-generating device 10 and a separate cartridge 20. In this example, the aerosol-generating system is an electrically operated vaping system.

The cartridge 20 contains an aerosol-forming substrate and is configured to be received in a cavity 18 within the device. Cartridge 20 should be replaceable by an adult vaper when the aerosol-forming substrate provided in the cartridge 20 is depleted. FIG. 5 shows the cartridge 20 just prior to insertion into the device, with the arrow 1 in FIG. 5 indicating the direction of insertion of the cartridge 20. The heater assembly with the filament arrangement 30 and the capillary medium 22 is located in the cartridge 20 behind a cover 26. The aerosol-generating device 10 is portable and may have a size comparable to a conventional cigar or cigarette. The device 10 comprises a main body 11 and a mouthpiece portion 12. The main body 11 contains a power supply 14, for example a battery such as a lithium iron phosphate battery, control electronics 16 and a cavity 18. The mouthpiece portion 12 is connected to the main body 11 by a hinged connection 21 and can move between an open position as shown in FIG. 5 and a closed position. The mouthpiece portion 12 is placed in the open position to allow for insertion and removal of cartridges 20 and is placed in the closed position when the system is to be used to generate aerosol. The mouthpiece portion comprises a plurality of air inlets 13 and an outlet 15. In use, an adult vaper draws or puffs on the outlet to draw air from the air inlets 13, through the mouthpiece portion and the cartridge 20 to the outlet 15. Internal baffles 17 are provided to force the air flowing through the mouthpiece portion 12 past the cartridge.

The cavity 18 has a circular cross-section and is sized to receive a housing 24 of the cartridge 20. Electrical connectors 19 are provided at the sides of the cavity 18 to provide an electrical connection between the control electronics 16 and battery 14 and corresponding electrical contacts on the cartridge 20.

Other cartridge designs incorporating a heater assembly with a filament arrangement 30 in accordance with this disclosure and/or a capillary medium 22 in accordance with this disclosure can now be conceived by one of ordinary skill in the art. For example, the cartridge 20 may include a mouthpiece portion 12, may include more than one heater assembly and may have any desired shape. Furthermore, a heater assembly in accordance with the disclosure may be used in systems of other types to those already described, such as humidifiers, air fresheners, and other aerosol-generating systems.

The exemplary embodiments described above illustrate but are not limiting. In view of the above discussed exemplary embodiments, other embodiments consistent with the above exemplary embodiments will now be apparent to one of ordinary skill in the art.

The invention claimed is:

1. An assembly, comprising:

a capillary medium defining a duct; and an air impingement structure defining a first opening, the air impingement structure including electrically conductive filaments that are fluid permeable, the air impingement structure being connected to a surface of the capillary medium, at least one first portion of the air impingement structure extending into the surface of the capillary medium.

2. The assembly of claim 1, wherein the duct is aligned with the first opening.

3. The assembly of claim 1, wherein the duct traverses through a longitudinal length of the capillary medium.

4. The assembly of claim 1, wherein the duct traverses through a longitudinal length of the capillary medium, the duct traversing through a first epicenter of the surface of the capillary medium.

5. The assembly of claim 4, wherein a second epicenter of the air impingement structure extends into the surface of the capillary medium, the at least one first portion including the second epicenter.

6. The assembly of claim 1, wherein the duct traverses through a longitudinal length of the capillary medium, the duct traversing through an epicenter of the surface of the capillary medium, the capillary medium having a cylindrical shape.

7. The assembly of claim 1, wherein the first opening traverses through a first surface and a second surface of the air impingement structure, the first surface and the second surface opposing each other on the air impingement structure.

8. The assembly of claim 7, wherein the first opening traverses through an epicenter of the air impingement structure, the air impingement structure having a circular horizontal cross-section.

9. The assembly of claim 1, wherein the capillary medium includes a first part and a second part.

10. The assembly of claim 9, wherein the air impingement structure is connected to the second part, the second part having a first thermal decomposition temperature that is higher than a second thermal decomposition temperature of the first part.

11. The assembly of claim 9, wherein the first opening extends into both the first part and the second part.

12. The assembly of claim 10, wherein the first opening extends into both the first part and the second part.

13. The assembly of claim 1, wherein the air impingement structure is in a shape of a cone or a concave surface.

14. The assembly of claim 13, wherein the first opening traverses through an epicenter of the air impingement structure, the air impingement structure having a circular horizontal cross-section.

15. The assembly of claim 1, wherein the air impingement structure is made from a mesh of the electrically conductive filaments.

16. The assembly of claim 1, further comprising:

a first contact and a second contact that are connected to the air impingement structure, the first contact and the second contact being electrically conductive.

17. The assembly of claim 16, wherein the first contact and the second contact are located at an interior portion and an exterior portion of the air impingement structure.

18. The assembly of claim 17, wherein the first contact extends through the duct.

19. The assembly of claim 1, further comprising:

a housing, the housing having a second opening that is in communication with the first opening.

20. The assembly of claim 19, further comprising:

a liquid aerosol-forming substrate infused within at least a portion of the capillary medium.

21. The assembly of claim 1, wherein the air impingement structure is configured to draw a liquid aerosol-forming substrate from the capillary medium to an upper surface of the air impingement structure, a lower surface of the air impingement structure being in direct contact with the capillary medium.

* * * * *